US012781303B2

(12) United States Patent
Maschler et al.

(10) Patent No.: US 12,781,303 B2
(45) Date of Patent: Nov. 3, 2026

(54) METHOD FOR RECRYSTALLISATION ANNEALING OF A NON-GRAIN-ORIENTED ELECTRIC STRIP

(71) Applicant: SMS group GmbH, Düsseldorf (DE)

(72) Inventors: Frank Maschler, Duisburg (DE); Andreas Böttcher, Duisburg (DE); Pierre-Yves Halleux, Angleur (BE)

(73) Assignee: SMS group GmbH, Düsseldorf (DE)

( * ) Notice: Subject to any disclaimer, the term of this patent is extended or adjusted under 35 U.S.C. 154(b) by 923 days.

(21) Appl. No.: 17/927,975

(22) PCT Filed: May 3, 2021

(86) PCT No.: PCT/EP2021/061507
§ 371 (c)(1),
(2) Date: Nov. 28, 2022

(87) PCT Pub. No.: WO2021/239394
PCT Pub. Date: Dec. 2, 2021

(65) Prior Publication Data

US 2023/0212708 A1 Jul. 6, 2023

(30) Foreign Application Priority Data

May 29, 2020 (DE) ..................... 10 2020 206 775.9
Feb. 19, 2021 (DE) ..................... 10 2021 201 616.2

(51) Int. Cl.
*C21D 9/60* (2006.01)
*C21D 1/42* (2006.01)
(Continued)

(52) U.S. Cl.
CPC ................. *C21D 9/60* (2013.01); *C21D 1/42* (2013.01); *C21D 1/76* (2013.01); *C21D 6/008* (2013.01);
(Continued)

(58) Field of Classification Search
CPC ... C21D 9/60; C21D 1/42; C21D 1/76; C21D 6/008; C21D 8/1272; C21D 8/1283;
(Continued)

(56) References Cited

U.S. PATENT DOCUMENTS 3,825,448 A 7/1974 Hartmann et al.
2013/0071687 A1* 3/2013 Takagi .................... C22C 38/04 148/534
(Continued)

FOREIGN PATENT DOCUMENTS

CN 104053796 A 9/2014
CN 104775021 A * 7/2015
(Continued)

OTHER PUBLICATIONS

Bleck, Wolfgang & Bruhl, F & Lesch, Christian. (2001). Inductive heating for the recrystallization of cold rolled steel strip. Stahl und Eisen. 121. 57-63.

(Continued)

*Primary Examiner* — Rebecca Janssen
(74) *Attorney, Agent, or Firm* — Smartpat PLC

(57) ABSTRACT

A method for the recrystallisation annealing of a non-grain-oriented electric strip (2) in a continuous annealing and coating line (1) is presented. Therein, the electric strip (2) is heated in an induction furnace (5) to a temperature of at least 680° C. at a heating rate of at least 80 K/s and then, in an optional second continuous furnace (8), to a temperature of at least 820° C. at a heating rate of at most 20 K/s. The electric strip (2) is initially heated before the induction furnace (5) via a first continuous furnace (3) to a temperature of at least 300° C. at a heating rate of at most 60 K/s.

19 Claims, 2 Drawing Sheets

(51) Int. Cl.

| | |
|---|---|
| ***C21D 1/76*** | (2006.01) |
| ***C21D 6/00*** | (2006.01) |
| ***C21D 8/1244*** | (2026.01) |
| ***C21D 8/1277*** | (2026.01) |
| ***C21D 9/56*** | (2006.01) |
| ***F27B 9/28*** | (2006.01) |
| ***F27B 9/30*** | (2006.01) |
| ***F27B 9/36*** | (2006.01) |
| ***F27D 11/06*** | (2006.01) |

(52) U.S. Cl.
CPC ......... *C21D 8/1272* (2013.01); *C21D 8/1283* (2013.01); *C21D 9/561* (2013.01); *F27B 9/28* (2013.01); *F27B 9/3005* (2013.01); *F27B 9/36* (2013.01); *F27D 11/06* (2013.01)

(58) Field of Classification Search
CPC .......... C21D 9/561; C21D 9/565; C21D 1/34; F27B 9/28; F27B 9/3005; F27B 9/36; F27B 9/3011; F27D 11/06; F27D 2007/063; F27D 7/06; Y02P 10/20; Y02P 10/25
See application file for complete search history.

(56) References Cited

U.S. PATENT DOCUMENTS

| | | | |
|---|---|---|---|
| 2018/0030558 | A1 | 2/2018 | Okubo et al. |
| 2018/0355454 | A1 | 12/2018 | Okubo et al. |
| 2019/0189318 | A1 | 6/2019 | Uesaka et al. |
| 2020/0291501 | A1 | 9/2020 | Zhang et al. |

FOREIGN PATENT DOCUMENTS

| | | | | | |
|---|---|---|---|---|---|
| CN | 108368561 | A | | 8/2018 | |
| EP | 0572780 | A2 | * | 12/1993 | ......... B21B 45/0284 |
| EP | 3263719 | A1 | | 1/2018 | |
| EP | 3378959 | A1 | | 9/2018 | |
| EP | 3388537 | A1 | | 10/2018 | |
| EP | 3378959 | B1 | * | 1/2020 | ........... C22C 38/008 |
| EP | 3399061 | B1 | | 6/2020 | |
| JP | S51149129 | A | | 12/1976 | |
| JP | H05156373 | A | | 6/1993 | |
| JP | 2009221578 | A | | 10/2009 | |
| JP | 2015160975 | A | | 9/2015 | |
| WO | 2019080482 | A1 | | 5/2019 | |

OTHER PUBLICATIONS

Pillar, Rachel Joanne, Milena Ginic-Markovic, Stephen Ross Clarke, A. K. Gibson, W. R. Bell, H. R. Brown, D. J. Willis, W. A. Renshaw, and Janis Gunars Matisons. "The effect of gas environment on rolling oil removal from cold-rolled steel as studied by TG." Journal of thermal analysis and calorimetry 80, No. 1 (2005): 211-216.

Sidor, Y., F. Kovac, and T. Kvackaj. "Grain growth phenomena and heat transport in non-oriented electrical steels." Acta materialia 55, No. 5 (2007): 1711-1722.

* cited by examiner

METHOD FOR RECRYSTALLISATION ANNEALING OF A NON-GRAIN-ORIENTED ELECTRIC STRIP

TECHNICAL FIELD

The present disclosure relates to a method for the recrystallization annealing of a non-grain-oriented electric strip in a continuous annealing and coating line.

BACKGROUND

Non-grain-oriented electric strip is generally used in the manufacture of electric machines, for example in the form of so-called laminates. The production of such non-grain-oriented electric strips usually takes place by casting a specific metallic composition into a slab and immediately hot rolling it into a so-called "hot strip." The hot strip is then subjected to an annealing treatment and in a further step cold-rolled into a so-called "cold strip." To achieve the advantageous magnetic properties, the cold strip is then recrystallizing annealed in a continuous annealing and coating line and subsequently coated with an insulating coating. Following the English usage, such a line is also called an "ACL" (annealing coating line).

From the European patent application EP 3 388 537 B1, a method for the production of a non-grain-oriented electric strip with a high magnetic flux density is known, with which the electric strip is annealed in two steps in order to achieve as homogeneous a fine grain size distribution as possible. The cold strip is initially heated to over 700° C. in an induction stage at 200 K/s, before being annealed in a second stage by means of radiant heat, in which targeted grain growth takes place.

Another method for producing a non-grain-oriented electric strip is known from European patent application EP 3 263 719 B1, with which the magnetic flux density of the electric strip is optimized by selectively adjusting the metallic composition.

The cold strip produced in the pre-process usually has noticeable residues of water, the rolling emulsions used, and other fluids on its strip surface that, as a result of the rapid heating, lead to condensate formation within the induction stage and considerably impair the quality of the electric strip due to dripping condensate. Furthermore, the condensed fluid precipitates can crack within the induction stage and form electrically conductive deposits, in which uncontrolled heat is induced.

SUMMARY

The present disclosure further develops a method for the recrystallization annealing of a non-grain-oriented electric strip in such a manner that microstructure recovery in the non-grain-oriented electric strip is suppressed as far as possible without the formation of condensate known from the prior art.

This is achieved by the method as claimed.

In accordance with the method for the recrystallization annealing of a non-grain-oriented electric strip in a continuous annealing and coating line, it is provided that the electric strip is heated in an induction furnace to a temperature of at least 680° C. at a heating rate of at least 80 K/s and then in an optional second continuous furnace to a temperature of at least 820° C. at a heating rate of at most 20 K/s.

The method is characterized by the fact that the non-grain-oriented electric strip is initially heated before the induction furnace via a first continuous furnace to a temperature of at least 300° C. at a heating rate of at most 60 K/s. As a result, residues such as water, oils and other fluids that remain on the strip surface of the electric strip from the pre-process can be evaporated particularly gently and without leaving any residue. Due to the high temperature of at least 300° C. inside the first continuous furnace, condensation of the residues is also effectively prevented.

The first continuous furnace can be a conventional continuous furnace heated by radiant heating tubes and/or electric heating elements.

For the benefit of the desired magnetic properties of the electric strip, a homogeneous fine-grained grain size distribution and a crystallographic texture are desired. This is achieved by the subsequent induction stage, in which the then residue-free electric strip is heated to a temperature of at least 680° C. at a heating rate of at least 80 K/s, preferably at a heating rate of at least 100 K/s, more preferably at a heating rate of at least 150 K/s, even more preferably at a heating rate in the range from 150 to 250 K/s, such that the range of microstructure recovery, which typically lies at a temperature in the range from 450° C. to 680° C., can be passed through rapidly in order to suppress the microstructure recovery as far as possible.

Further advantageous embodiments of the invention are indicated in the dependent formulated claims. The features listed individually in the dependent formulated claims can be combined with one another in a technologically useful manner and can define further embodiments of the invention. In addition, the features indicated in the claims are further specified and explained in the description, wherein further preferred embodiments of the invention are illustrated.

Preferably, the heating rate in the first continuous furnace is at most 50 K/s, more preferably at most 45 K/s, more preferably at most 40 K/s, even more preferably 35 K/s, and most preferably at most 30 K/s. However, for reasons of costs efficiency, the heating rate must not be too small, such that it is preferably at least 10 K/s, more preferably at least 15 K/s and even more preferably at least 20 K/s.

The dwell time during which the electric strip passes through the first continuous furnace is therefore at least 5 s and is limited to 20 s. More preferably, the dwell time in the first continuous furnace amounts to 10 to 15 seconds.

As already explained, the microstructure recovery of the electric strip must be suppressed as far as possible in order to achieve the desired magnetic properties, such as a high magnetic flux density. The temperature to which the electric strip is heated in the first continuous furnace is therefore limited to a maximum of 500° C., preferably to a temperature of maximum 480° C., more preferably to a temperature of maximum 460° C. and most preferably to a temperature of maximum 450° C.

A particularly preferred temperature range to which the electric strip is heated in the first continuous furnace amounts to 350 to 420° C.

The evaporation of the residues from the electric strip in the first continuous furnace can lead to a strong emission of smoke. In a particularly advantageous embodiment, it is therefore provided that the first continuous furnace is continuously flushed with a flushing gas, which is particularly preferably fed to the first continuous furnace in counterflow. In this connection, it is particularly preferred that the flushing gas is a hydrogen-rich gas that advantageously has a hydrogen content of 20 to 50% by volume.

Preferably, the electric strip is heated in the induction furnace in two stages. Thus, in a first stage, the electric strip is initially heated to a temperature in the range of 680-700° C. at a heating rate of at least 80 K/s, preferably at a heating rate of at least 100 K/s, more preferably at a heating rate of at least 150 K/s, even more preferably at a heating rate in the range of 150 to 250 K/s. Advantageously, this is done by means of a longitudinal field inductor, which heats the electric strip uniformly over the entire strip width.

In the second stage subsequent to this, the electric strip is then heated to a temperature in the range of 700-950° C., preferably to a temperature in the range of 720-800° C., even more preferably to a temperature in the range of 740-780° C. A transverse field inductor can be used for such higher strip temperatures. This generates significant temperature differences of 10 to 30 K over the entire strip width of the electric strip, mostly in the form of temperature deviations of the strip edges compared to the center of the strip.

In the second continuous furnace subsequent to the induction furnace, which can again be in the form of a conventional continuous furnace, the electric strip is heated to a temperature of at least 820° C., preferably to a temperature in the range of 820-1100° C., more preferably to a temperature in the range of 820-1050° C. at a heating rate of at most 20 K/s, preferably at a heating rate of at most 15 K/s. For reasons of quality, the temperature differences over the strip width generated in the induction furnace must decay of the electric strip until the holding temperature is reached. Advantageously, this requires a dwell time of at least 5 s, preferably at least 10 s, during which the electric strip is annealed at a temperature in the range of 820-1050° C.

The second continuous furnace is followed by the usual furnace sections for holding to the target temperature along with a cooling section.

The invention and the technical environment are explained in more detail below with reference to the figures. It should be noted that the invention is not provided to be limited by the exemplary embodiments shown. In particular, unless explicitly shown otherwise, it is also possible to extract partial aspects of the facts explained in the figures and combine them with other components and findings from the present description and/or figures. In particular, it should be noted that the figures and in particular the size relationships shown are only schematically. Identical reference signs designate identical objects, such that explanations from other figures can be used as a supplement if necessary.

DETAILED DESCRIPTION

Figure 1:
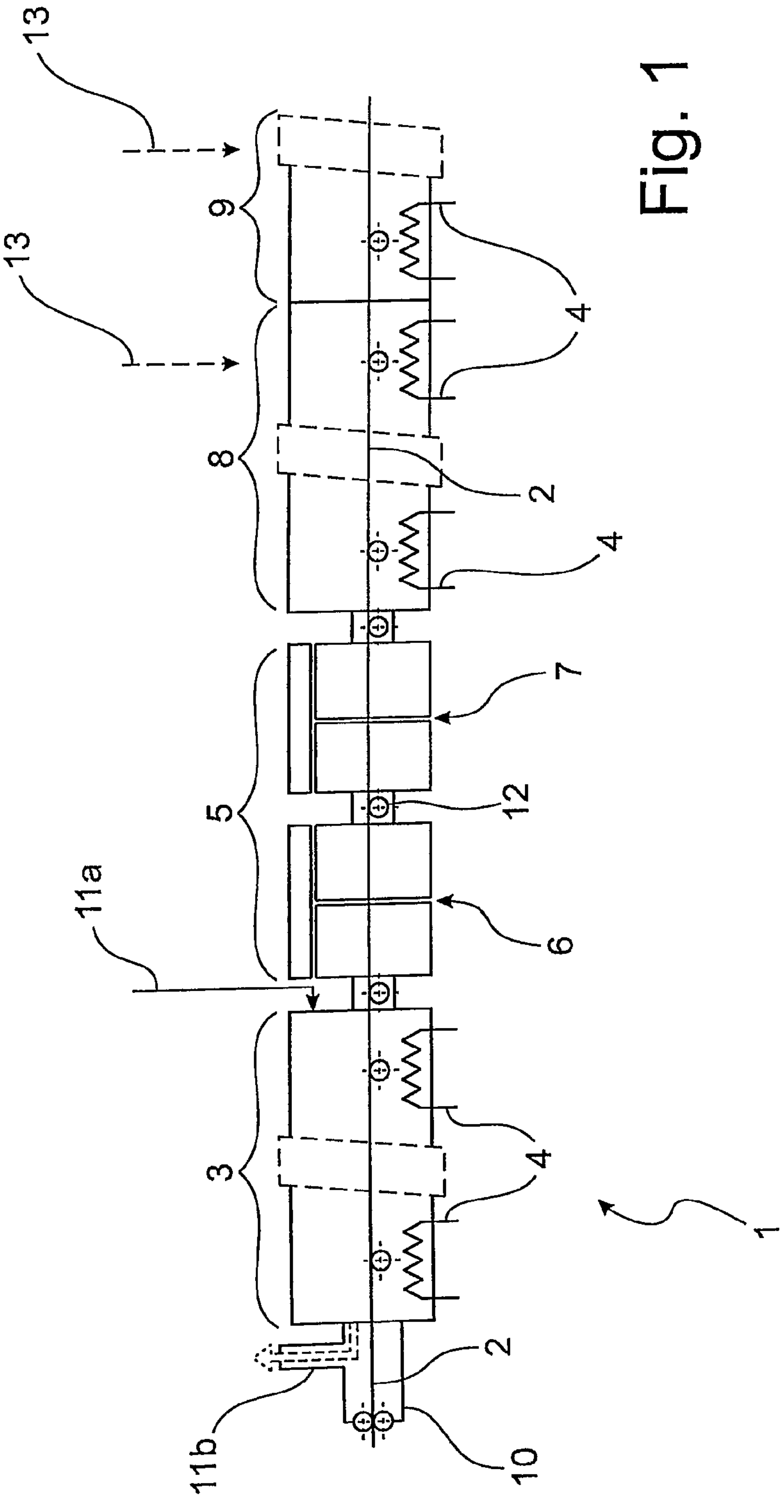
FIG. 1 shows an embodiment of an annealing and treatment line for carrying out the method for the recrystallization annealing of a non-grain-oriented electric strip.
Figure 2:
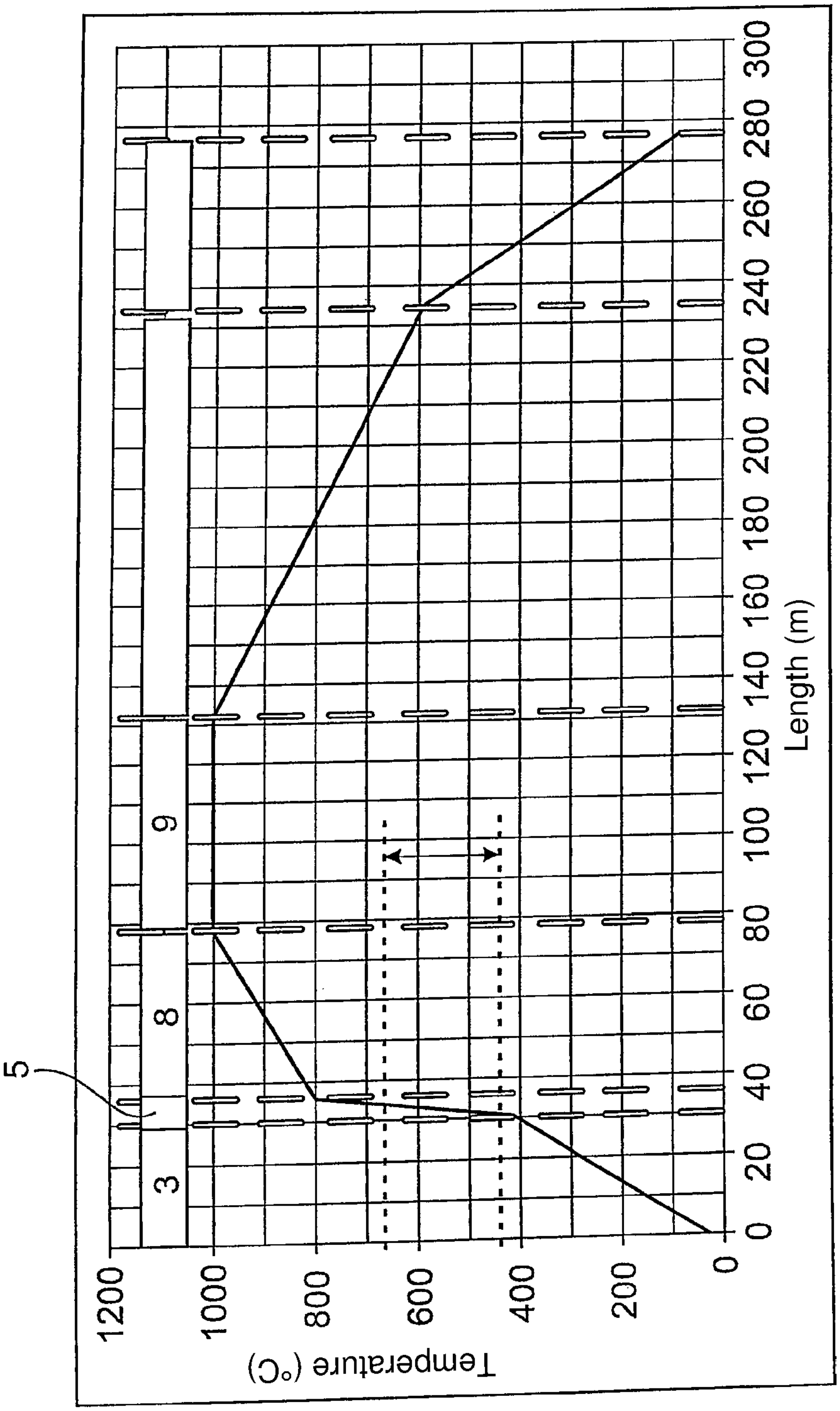
FIG. 2 shows an embodiment of the temperature profile of the method for the recrystallization annealing of a non-grain-oriented electric strip.

FIG. 1 shows an embodiment of an annealing and treatment line 1 for carrying out the method for the recrystallization annealing of a non-grain-oriented electric strip, in which, for example, a non-grain-oriented electric strip 2 with a width of 1200 mm and a strip thickness of 500 μm is subjected to a temperature treatment at a strip speed of 150 m/min, as shown for example in FIG. 2.

The annealing and treatment line 1 comprises a first continuous furnace 3 with electric heating elements 4, by means of which the electric strip 2 is heated. The first continuous furnace 3 has a length of 30 m. Downstream in the direction of strip travel is an induction furnace 5, which is formed from two separate stages 6, 7 and has a total length of 6 m. A second continuous furnace 8, which is also conventionally heated by heating elements 4, follows to the induction furnace 5. The second continuous furnace 8 has a length of 42 m. A holding zone 9 with a length of 54 m is also provided downstream of the second continuous furnace 8.

As shown in FIG. 1, the non-grain-oriented electric strip 2 initially enters the first radiation-heated continuous furnace 3 via an entry channel 10. The electric strip 2 is heated to 450° C. within 30 seconds. Up to this temperature, the microstructure recovery is negligible. The low heating rate of 15 K/s is advantageous in order to evaporate the unavoidable residues from the pre-process on the electric strip 2 slowly and without cracking. The hot inner walls of the first continuous furnace 3 guarantee that the residues now in the gas atmosphere do not condense. The evaporation of the residues from the electric strip 2 usually leads to a strong emission of smoke. Therefore, the first continuous furnace 3 is continuously flushed in counterflow with a hydrogen-rich flushing gas, which is supplied to the first continuous furnace 3 through an inlet opening 11*a* and discharged through an outlet opening 11*b*.

Alternatively and/or additionally, the flushing gas can also be supplied to the treatment line 1 further downstream, for example via the second continuous furnace 8 and/or via the holding zone 9, as indicated by the arrows 13.

The electric strip 2 then passes through induction furnace 5, where it is initially heated up to 700° C. in a longitudinal field inductor 6 and then up to 800° C. in a transverse field inductor 7. Furnace rollers 12 are located between the individual stages 6, 7 in order to keep the strip sag low and to ensure precise guidance of the electric strip 2 through the narrow gaps of the two inductors 6, 7.

Since the furnace roller 12 is located outside the inductors 6, 7, there is an unavoidable interruption in the heating. However, the resulting average heating rate in the induction furnace 5 of 180 K/s is high enough to reliably suppress microstructure recovery and thus non-uniform grain growth.

Further heating to 1,000° C. takes place in the radiation-heated second continuous furnace section 8. The heating rate in this continuous furnace 8 is insignificant in terms of quality and thus depends only on its construction length and on ensuring sufficient heating time.

In the holding zone 9, the desired grain size is set in the microstructure by holding the strip temperature at 1,000° C. with a dwell time of presently 26 s.

This is followed by a slow cooling system and a rapid cooling system (not shown in FIG. 1), which are designed in a manner familiar to the skilled person.

LIST OF REFERENCE SIGNS

- 1 Annealing and treatment line
- 2 Electric strip
- 3 First continuous furnace
- 4 Electric heating elements.
- 5 Induction furnace
- 6 First stage/longitudinal field inductor
- 7 Second stage/transverse field inductor
- 8 Second continuous furnace
- 9 Holding zone
- 10 Entry channel
- 11*a* Inlet opening for flushing gas
- 11*b* Outlet opening for flushing gas
- 12 Furnace rollers
- 13 Arrow

The invention claimed is:

1. A method for recrystallization annealing of a non-grain-oriented electric strip (2) in a continuous annealing and coating line (1), comprising:

initially heating the electric strip (2) by a first continuous furnace (3) to a temperature of at least 300° C. at a heating rate of at most 60 K/s, wherein the heating in the first continuous furnace (3) is carried out such that residues comprising water, oils, or rolling emulsions present on the electric strip (2) are evaporated in a controlled manner without cracking and are maintained in a vapor phase, and wherein the first continuous furnace (3) is continuously flushed with a flushing gas flowing in counterflow to a movement of the electric strip (2), the flushing gas comprising hydrogen and having a hydrogen content of 20 to 50% by volume, such that condensation of the evaporated residues within the first continuous furnace (3) and in a downstream induction furnace (5) is prevented;

thereafter heating the electric strip (2) in an induction furnace (5) to a temperature of at least 680° C. at a heating rate of at least 80 K/s; and thereafter heating the electric strip (2) in a second continuous furnace (8) to a temperature of at least 820° C. at a heating rate of at most 20 K/s.

2. The method according to claim 1, wherein the electric strip (2) passes through the first continuous furnace (3) with a dwell time of at least 5 s.

3. The method according to claim 1, wherein the electric strip (2) is heated in the first continuous furnace (3) to a temperature of at most 500° C.

4. The method according to claim 1, wherein the electric strip (2) is heated in the first continuous furnace (3) to a temperature of at most 450° C.

5. The method according to claim 1, wherein the heating rate in the first continuous furnace (3) is at most 50 K/s.

6. The method according to claim 1, wherein the heating rate in the first continuous furnace (3) is at most 30 K/s.

7. The method according to claim 1, wherein heating the electric strip (2) in the induction furnace (5) is performed in two stages by heating the electric strip (2) initially in a first stage (6) to a temperature in the range of 680-700° C. and then in a second stage (7) to a temperature in the range of 700-950° C.

8. The method according to claim 7, wherein heating the electric strip (2) in the first stage (6) is performed by a longitudinal field inductor and wherein heating the electric strip (2) in the second stage (7) is performed by a transverse field inductor.

9. The method according to claim 1, further comprising annealing the electric strip (2) in the second continuous furnace (8) at a temperature in the range of 820-1050° C. for at least 5 s.

10. The method according to claim 9, wherein the annealing is carried out initially in a first step at a temperature in the range of 820 to 880° C. and then in a second step at a temperature in the range of 900 to 1150° C.

11. The method according to claim 1, wherein the electric strip (2) is heated in the first continuous furnace (3) to a temperature in the range of 350 to 420° C.

12. The method according to claim 1, wherein the heating rate in the first continuous furnace (3) is at least 10 K/s.

13. The method according to claim 12, wherein the heating rate in the first continuous furnace (3) is at least 20 K/s.

14. The method according to claim 1, wherein the electric strip (2) passes through the first continuous furnace (3) with a dwell time of at most 20 s.

15. The method according to claim 14, wherein the dwell time is in a range of 10 to 15 s.

16. The method according to claim 1, wherein the first continuous furnace (3) is operated such that a temperature of furnace walls is maintained above a condensation temperature of the residues.

17. The method according to claim 1, wherein the flushing gas removes evaporated residues from the first continuous furnace (3) during heating.

18. The method according to claim 1, wherein the electric strip (2) is heated in the induction furnace (5) such that a temperature range from 450° C. to 680° C. is passed through at a rate sufficient to suppress microstructure recovery.

19. The method according to claim 8, wherein the longitudinal field inductor is configured to heat the electric strip (2) uniformly across a strip width, and the transverse field inductor is configured to generate temperature differences across the strip width.

* * * * *